United States Patent

Ishikawa et al.

[11] Patent Number: 5,556,561
[45] Date of Patent: Sep. 17, 1996

[54] METHOD OF FORMING A WELD JOINT OF AUSTENITIC STAINLESS STEEL/FERRITIC STEEL

[75] Inventors: Kaneyasu Ishikawa; Fumio Mitsuura; Fujimitsu Masuyama, all of Nagasaki, Japan

[73] Assignee: Mitsubishi Jukogyo Kabushiki Kaisha, Tokyo, Japan

[21] Appl. No.: 370,108

[22] Filed: Jan. 9, 1995

[30] Foreign Application Priority Data

Feb. 17, 1994 [JP] Japan .................................. 6-020481

[51] Int. Cl.$^6$ ............................. B23K 35/00; C22C 38/40; C22C 19/05
[52] U.S. Cl. ............................. 219/137 WM; 219/146.23; 228/262.41; 420/43; 420/452
[58] Field of Search .................................. 219/137 WM, 219/146.23; 228/262.41; 420/43, 452; 148/327, 427; 428/685, 684, 683

[56] References Cited

U.S. PATENT DOCUMENTS 2,770,030  11/1956  Carpenter et al. ..................... 29/196.1
4,525,620  6/1985  Deverell et al. ................. 219/137 WM
4,703,885  11/1987  Lindgren et al. ................... 228/263.15

FOREIGN PATENT DOCUMENTS 0411515  2/1991  European Pat. Off. .
0505732  9/1992  European Pat. Off. .

OTHER PUBLICATIONS

Koyama, Patent Abstracts of Japan, vol. 10, No. 295 (M–523) [2351], Oct. 7, 1986 & JP–A–61 108477.
King et al., "Development Of An Improved Stainless Steel To Ferritic Steel Transition Joint", Welding Journal, vol. 56, No. 11, Nov. 1977, pp. 354s–358s.

Primary Examiner—Deborah Yee
Attorney, Agent, or Firm—Wenderoth, Lind & Ponack

[57] ABSTRACT

A method of forming a weld joint between an austenitic stainless steel and a ferritic steel. The ferritic steel contains 0.03 to 0.12% carbon, 0.70% or less silicon, 0.10 to 1.50% manganese, 0.030% or less phosphorus, 0.015% or less sulphur, 1.50 to 3.50% chromium, 0.40% or less molybdenum, 1.00 to 3.00% tungsten, 0.10 to 0.35% vanadium, 0.01 to 0.10% niobium, 0.030% or less Sol. aluminum, 0.020% or less boron, and 0.030% or less nitrogen.

3 Claims, 1 Drawing Sheet

METHOD OF FORMING A WELD JOINT OF AUSTENITIC STAINLESS STEEL/FERRITIC STEEL

BACKGROUND OF THE INVENTION

1. Field of the Invention

The present invention relates to a method of forming a weld joint between an austenitic stainless steel and a ferritic steel. The steels as joined are used to form part of a superheater or a reheater for a power boiler, which is subject to high temperature and high pressure.

2. Description of the Related Art

Two different metals, a low chromium-molybdenum alloy ferritic steel and an austenitic stainless steel, used in such a power boiler are welded together by a welding material such as D309 and inconel.

The low chromium-molybdenum alloy ferritic steel typically contains 0.15% or less carbon, 0.50% or less silicon, 0.30 to 0.60% manganese, 0.030% or less phosphorus, 0.030% or less sulphur, 1.90 to 2.60% chromium, and 0.87 to 1.13% molybdenum (see JISG3462STBA24). The austenitic stainless steel typically contains 0.04 to 0.10% carbon, 1.00% or less silicon, 2.00% or less manganese, 0.030% or less phosphorus, 0.030% sulphur, 9.00 to 13.00% nickel, 17.00 to 20.00% chromium, and 8×C% to 1.00 niobium (see JISG3463SUS347HTB).

The ferritic steel (coefficient of thermal expansion: about $13 \times 10^{-6}/°K$.) and the austenitic stainless steel (coefficient of thermal expansion: about $17 \times 10^{-6}/°K$.) have different coefficients of thermal expansion. A portion of the ferritic steel adjacent to the joint suffers from creep or creep fatigue fracture caused by thermal stresses since the boiler tends to employ high temperature, high pressure steam and is operated and stopped on a daily or weekly basis. As this occurs, the boiler is subject to malfunction. The JISG3462STBA24 ferritic steel has a creep-rupture strength of 2.2 kgf/mm² when exposed for 100,000 hours at 600° C. (see data provided by Metal Laboratory in the Bureau of Science and Technology, NRIM).

SUMMARY OF THE INVENTION

Accordingly, it is an object of the present invention to overcome the foregoing problems and provide a method of forming a weld joint between a ferritic steel and an austenitic stainless steel, which retains the ferritic steel against creep or creep fatigue fracture caused by thermal stresses.

The present invention provides a method of forming a weld joint between an austenitic stainless steel and a ferritic steel. The ferritic steel contains 0.03 to 0.12% carbon, 0.70% or less silicon, 0.10 to 1.50% manganese, 0.030% or less phosphorus, 0.015% or less sulphur, 1.50 to 3.50% chromium, 0.40% or less molybdenum, 1.00 to 3.00% tungsten, 0.10 to 0.35% vanadium, 0.01 to 0.10% niobium, 0.030% or less Sol. aluminum, 0.020% or less boron, and 0.030% or less nitrogen.

Further, in the present invention, a welding material contains 0.10% or less carbon, 0.50% or less silicon, 2.5 to 3.5% manganese, 0.030% or less phosphorus, 0.015% or less sulphur, 67% or more nickel, 18.0 to 22.0% chromium, 3.0% or less iron, and 2.0 to 3.0% niobium and tantalum. Alternatively, it may contain 1.5% or less carbon, 0.90% or less silicon, 2.5% or less manganese, 0.040% or less phosphorus, 0.030% or less sulphur, 12.0 to 14.0% nickel, 22.0 to 25.0% chromium, and a balance of iron.

A portion of the low chromium-molybdenum alloy ferritic steel which is joined to the austenitic stainless steel suffers from creep or creep fatigue fracture due to the difference in coefficient of thermal expansion between the two steels when the boiler is started or heated and is stopped or cooled. This appreciably affects the strength of the materials at high temperatures, and particularly the creep strength.

To this end, the present invention employs a ferritic steel which has substantially the same chromium content as and is approximately twice as strong as a conventional low chromium-molybdenum alloy ferritic steel such as 2(¼)chromium-molybdenum steel. This gives improved resistance to creep to a joined portion of the ferritic steel which is subject to thermal stresses. The ferritic steel is thus free from damage and has longer service life. A welding material contains 0.10% or less carbon, 0.50% or less silicon, 2.5 to 3.5% manganese, 0.030% or less phosphorus, 0.015% or less sulphur, 67% or more nickel, 18.0 to 22.0% chromium, 3.0% or less iron, and 2.0 to 3.0% niobium and tantalum. Alternatively, it may contain 1.5% or less carbon, 0.90% or less silicon, 2.5% or less manganese, 0.040% or less phosphorus, 0.030% or less sulphur, 12.0 to 14.0% nickel, 22.0 to 25.0% chromium, and a balance of iron. This welding material also gives longer service life.

According to the present invention, the ferritic steel contains such elements as to retain its creep strength as stated earlier. The addition of these elements influences the structural characteristics of the ferritic steel as will be explained below.

The carbon content of the ferritic steel ranges from 0.03 to 0.12% and preferably, from 0.04 to 0.08%. The creep strength decreases when the carbon content drops below 0.03%. A carbon content of over 0.12% deteriorates the weldability.

Silicon content is less than 0.70%. A small amount of silicon is inevitably added to the ferritic steel, and its minimum content is specifically 0.10%. Preferably, the silicon content ranges from 0.20 to 0.60%. A silicon content of over 0.70% results in lower tenacity.

Manganese content is between 0.10 and 1.50% and preferably between 0.30 and 0.60%. The steel suffers from a loss in its tensile strength if the manganese content decreases below 0.10%. The creep strength also decreases if the manganese content increases above 1.50%.

Phosphorus content is below 0.030%. A small amount of phosphorus is inevitably added, and its minimum content is specifically 0.005%. Preferably, the phosphorus content ranges from 0.005 to 0.020%. The tenacity decreases if the phosphorus content exceeds 0.030%.

Sulphur content is below 0.015%. A small amount of sulphur is inevitably added, and its minimum content is specifically 0.005%. Preferably, the sulphur content ranges from 0.005 to 0.010%. The tenacity decreases if the sulphur content exceeds 0.015%.

Chromium content is between 1.50 and 3.50% and preferably, between 1.90 and 2.60%. A chromium content of below 1.50% results in lower resistance to oxidation. If the chromium content increases above 3.50%, a ferrite phase appears, and the tenacity decreases.

Molybdenum content is below 0.40%. A small amount of molybdenum is inevitably added, and its minimum content is specifically 0.01%. Preferably, the molybdenum content ranges from 0.05 to 0.30%. If it exceeds 0.40%, the creep strength decreases.

Tungsten content is between 1.00 and 3.00% and preferably, between 1.45 and 1.75%. A tungsten content of below 1.00% results in lower creep strength. If it exceeds 3.00%, the tenacity decreases.

Vanadium content is between 0.10 and 0.35% and preferably, between 0.20 and 0.30%. A vanadium content of below 0.10% or over 0.35% results in lower creep strength.

Niobium content is between 0.01 and 0.10% and preferably, between 0.02 and 0.08%. A niobium content of below 0.01% results in lower creep strength. A niobium content of over 0.10% results in the creep strength and tenacity over a prolonged period of time.

Sol. aluminum content is below 0.030%. A small amount of Sol. aluminum is inevitably added, and its minimum content is specifically 0.01%. Preferably, it ranges from 0.01 to 0.02%. A Sol. aluminum content in excess of 0.030% results in a loss of creep strength.

Boron content is below 0.020%, preferably between 0.0001 and 0.020%. More preferably, it ranges from 0.0001 to 0.010%. A boron content in excess of 0.020% results in a loss of tenacity.

Nitrogen content is below 0.030%. A small amount of nitrogen is inevitably added, and its minimum content is specifically 0.001%. Preferably, the nitrogen content ranges from 0.001 to 0.005%. If it exceeds 0.030%, the creep strength substantially decreases.

According to the present invention, a welding material such as Y309 and inconel is used to weld the ferritic steel and the austenitic stainless steel. Specifically, Y309 contains 0.12% carbon, 0.65% or less silicon, 1.0 to 2.5% manganese, 0.030% or less phosphorus, 0.030% or less sulphur, 12.0 to 14.0% nickel, 23.0 to 25.0% chromium, and a balance of iron (see JISZ3321Y309). Inconel 82 contains 0.10% or less carbon, 0.50% or less silicon, 2.5 to 3.5% manganese, 0.03% or less phosphorus, 0.015% or less sulphur, 67.0% or more nickel, 18.0 to 22.0% chromium, 3.0% or less iron, and 2.0 to 3.0% niobium and tantalum (see American Welding Society, A5.14, ERNiCr3). Inconel gives longer service life than Y309 does.

DESCRIPTION OF THE PREFERRED EMBODIMENTS

Figure 1:
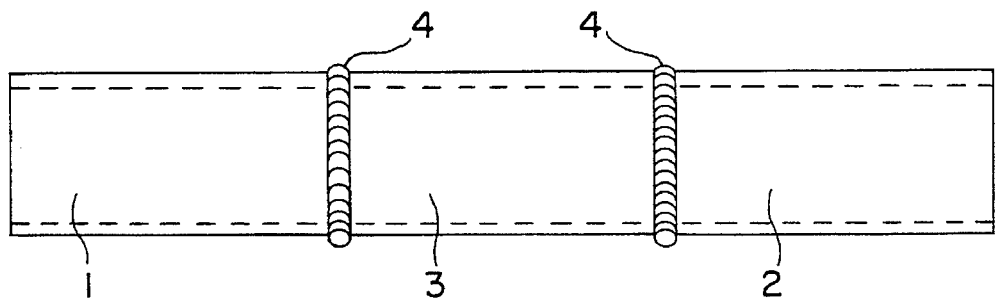
FIG. 1 is a plan view of a ferritic steel according to the present invention and a conventional 2(¼) chromium-molybdenum ferritic steel joined to an austenitic stainless steel by using a Y309 welding wire.
Figure 2:
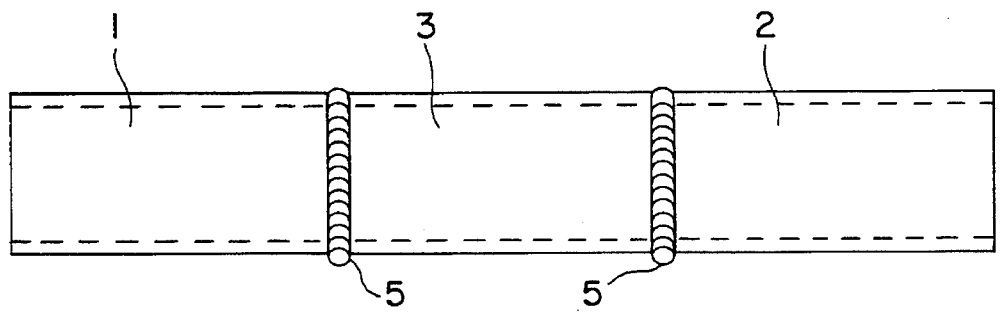
FIG. 2 is a plan view of a ferritic steel according of the present invention and a conventional 2(¼) chromium-molybdenum ferritic steel joined to an austenitic stainless steel by using an inconel 82 welding wire.
Figure 3:
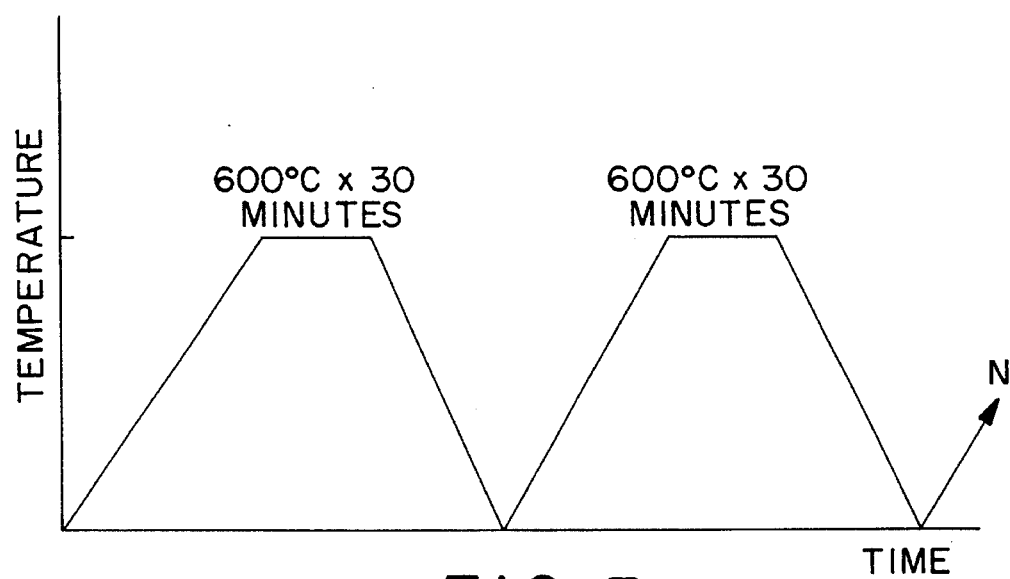
FIG. 3 is a graph showing a heat cycle of acceleration test on a weld joint formed according to the present invention.

FIGS. 1 and 2 show a ferritic steel 1 according to the present invention and a conventional 2(¼)Cr—Mo ferritic steel 2 welded to an austenitic stainless steel 3. The austenitic stainless steel 3 has a diameter of 42.7 mm and a thickness of 9 mm and contains 0.09% carbon, 0.46% silicon, 1.51% manganese, 0.025% phosphorus, 0.001% sulphur, 18.5% chromium, 12.60% nickel, and 0.87% niobium. The ferritic steel 1 according to the present invention contains 0.05% carbon, 0.21% silicon, 0.49% manganese, 0.015% phosphorus, 0.001% sulphur, 2.17% chromium, 0.11% molybdenum, 1.59% tungsten, 0.23% vanadium, 0.05% niobium, 0.008% Sol. aluminum, 0.0042% boron, and 0.008% nitrogen. The conventional 2(¼)Cr—Mo ferritic steel 2 contains 0.11% carbon, 0.27% silicon, 0.41% manganese, 0.015% phosphorus, 0.008% sulphur, 2.11% chromium, and 0.95% molybdenum. FIG. 3 shows a heat cycle given to the weld joint.

FIG. 1 shows a method of forming weld joints by a downwardly directed automatic TIG welding technique, using a Y309 welding wire 4. The Y309 welding wire 4 has a diameter of 1.6 mm and contains 0.06% carbon, 0.52% silicon, 1.97% manganese, 0.024% phosphorus, 0.003% sulphur, 13.52% nickel, 23.35% chromium, and a balance of iron. A welding current of 120 to 190A passes through the welding wire. FIG. 2 also shows a method of forming weld joints by a downwardly directed automatic TIG welding technique, using an inconel 82 welding material 5. The inconel 82 welding material 5 contains 0.02% carbon, 0.13% silicon, 2.87% manganese, 0.003% phosphur, 0.002% sulphur, 71.32% nickel, 20.72% chromium, and a balance of iron. A welding current of 95 to 210A passes through the welding material. In either case, eight layers are formed.

The weld joints are introduced into an electric furnace maintained at a temperature of 600° C. and are heat treated for thirty minutes. Thereafter, the weld joints are removed from the electric furnace and cooled to room temperature. This cycle of operation is repeated. One of the weld joints made by the use of the Y309 welding wire suffered from fracture at a region adjacent to the 2(¼) Cr—Mo steel when the cycle was repeated 100 times. The other weld joints suffered from fracture when the cycle was repeated 166 times. On the other hand, the weld joints adjacent to the ferritic steel made according to the present invention did not suffer from any fracture even when the cycle was repeated 350 times. The ferritic steel of the present invention is thus twice as strong as the conventional steel.

As is clear from the foregoing results, the weld joint of the ferritic steel according to the present invention has a service life 2.1 times longer than that of the conventional 2(¼)Cr—Mo ferritic steel when the Y309 welding wire is used, and 4.4 times longer when the inconel 82 welding wire is used. Also, it has been found that the weld joint has a service life 2.1 times longer when the inconel 82 welding wire is used than when the Y309 welding wire is used.

The weld joint of the ferritic steel made according to the present invention has a creep-rupture strength of 8.4 kgf/mm$^2$ when exposed for 100,000 hours at a temperature of 600 ° C. as compared to 2.2 kgf/mm$^2$ for the weld joint of the conventional 2(¼) Cr—Mo ferritic steel.

The use of the ferritic steel made according to the present invention prevents creep fracture and gives weld joints having longer service life. Also, the use of inconel as a welding material enables the weld joints to have a service life 2.1 times longer than that when Y309 is used.

What is claimed is:

1. A method of joining an austenitic stainless steel and a ferritic steel, which comprises forming a weld joint between the austenitic stainless steel and the ferritic steel, said ferritic steel consisting essentially of 0.03 to 0.12% carbon, 0.70% or less silicon, 0.10 to 1.50% manganese, 0.030% or less phosphorus, 0.015% or less sulphur, 1.50 to 3.50% chromium, 0.40% or less molybdenum, 1.00 to 3.00% tungsten, 0.10 to 0.35% vanadium, 0.01 to 0.10% niobium, 0.030% or less Sol. aluminum, 0.020% or less boron, 0.030% or less nitrogen, and a balance of iron.

2. The method of claim 1, wherein said weld joint is formed by using a welding material consisting essentially of 0.10% or less carbon, 0.50% or less silicon, 2.5 to 3.5% manganese, 0.030% or less phosphorus, 0.015% or less sulphur, 67% or more nickel, 18.0 to 22.0% chromium, 3.0 or less iron, and 2.0 to 3.0% niobium and tantalum.

3. The method of claim 1, wherein said weld joint is formed by using a welding material including 1.5% or less carbon, 0.90% or less silicon, 2.5% or less manganese, 0.040% or less phosphorus, 0.030% or less sulphur, 12.0 to 14.0% nickel, 22.0 to 25.0% chromium, and a balance of iron.

* * * * *